United States Patent
Sato (10) Patent No.: US 6,718,159 B1
(45) Date of Patent: Apr. 6, 2004

(54) RADIO COMMUNICATION SYSTEM AND METHOD

(75) Inventor: Hiroaki Sato, Ehime (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/495,945

(22) Filed: Feb. 2, 2000

(30) Foreign Application Priority Data

Feb. 3, 1999 (JP) ............................................ 11-026360

(51) Int. Cl.⁷ ............................................... H04B 7/15
(52) U.S. Cl. ........................... 455/11.1; 455/7; 455/517; 370/315; 370/351
(58) Field of Search .............................. 455/450, 15, 7, 455/11.1, 445, 517, 403, 422.1; 370/328, 338, 400, 351, 315, 277, 356, 465; 375/308, 329

(56) References Cited

U.S. PATENT DOCUMENTS

| | | | |
|---|---|---|---|
| 4,125,808 A | * 11/1978 | Graham ........................ | 325/55 |
| 4,399,531 A | * 8/1983 | Grande et al. .............. | 370/216 |
| 5,369,781 A | * 11/1994 | Comroe et al. .............. | 455/15 |
| 5,592,491 A | * 1/1997 | Dinkins ...................... | 370/277 |
| 5,621,732 A | * 4/1997 | Osawa ........................ | 370/79 |
| 5,689,081 A | * 11/1997 | Tsurumi ..................... | 84/609 |
| 5,864,298 A | * 1/1999 | Vogel ....................... | 340/7.25 |
| 5,903,618 A | * 5/1999 | Miyake et al. .............. | 375/356 |
| 5,907,540 A | * 5/1999 | Hayashi ..................... | 370/315 |
| 5,930,243 A | * 7/1999 | Parish et al. ................ | 370/334 |
| 5,974,325 A | * 10/1999 | Kotzin et al. ............... | 455/450 |
| 6,028,857 A | * 2/2000 | Poor ......................... | 370/351 |

FOREIGN PATENT DOCUMENTS

| | | |
|---|---|---|
| JP | 5235838 | 9/1993 |
| JP | 5292577 | 11/1993 |
| JP | 8-97821 | 4/1996 |
| JP | 9-252277 | 9/1997 |

* cited by examiner

*Primary Examiner*—Erika Gary
(74) *Attorney, Agent, or Firm*—Wenderoth, Lind & Ponack, L.L.P.

(57) ABSTRACT

In a radio communication system wherein a plurality of radio stations perform data exchange by radio communication, each of the radio stations has a function of outputting data to another radio station in the radio communication system, a function of receiving data from another radio station, and a function of relaying data in response to a request from another radio station. When the radio station outputs data to a specific target radio station but there is no acknowledgment from the target radio station, the radio station outputs relay requests to many unspecified radio stations. The radio stations, which have received the relay requests, relay and output the data simultaneously to the target radio station. Further, when the target radio station, which has received the data relayed by the many unspecified relay stations, acknowledges the receipt of the data, it selects an optimum radio station for relaying the data from the reception level status of radio packets which have been simultaneously transmitted from the many unspecified radio stations, and outputs acknowledgment data to the selected radio station.

5 Claims, 10 Drawing Sheets

RADIO COMMUNICATION SYSTEM AND METHOD

FIELD OF THE INVENTION

The present invention relates to a radio communication system in which a plurality of radio communication stations exchange data. More particularly, the invention relates to a radio communication system in which, when radio stations of relatively small output powers exchange data, data transmission is relayed to extend the communication area.

BACKGROUND OF THE INVENTION

When a plurality of radio stations having no master station exchange data, a radio station as a transmitter specifies a destination radio station when transmitting data. However, in radio equipment which needs no license, such as specific low-power radio equipment or minute power radio equipment, since the output power from the radio equipment is low, a relay station is required to extend the transmission range.

In the conventional radio communication system, the 2-frequency simplex relay method or the 4-frequency duplex relay method is generally employed, as disclosed in "400 MHz band data transmitting radio equipment for a specific low-power radio station (RCR STD-17A)".

Figure 1:
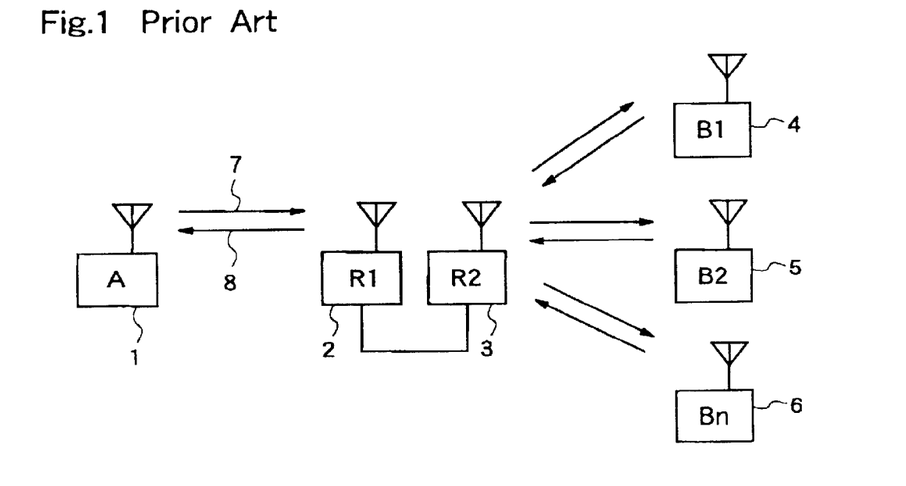
FIG. 1 is a diagram for explaining a data relay method in the conventional radio communication system.

FIG. 1 shows a typical four-frequency duplex relay system.

Communication between a radio station A(1) and a relay station R1(2) and communication between a relay station R2(3) and each of radio stations B1(4), B2(5), ... Bn(6) are performed using pair frequencies of different frequency channels, respectively. In this relay system, when the radio station A(1) and the radio station Bn(6) communicate through the relay stations R1(2) and R2(3), the calling radio station A(1) is connected with the relay station R1(2) according to a line connection procedure. In FIG. 1, a frequency Fa(7) at which the station A(1) communicates with the relay station R1(2) and a frequency Fr1(8) at which the relay station R1(2) communicates with the station A, are pair frequencies of a predetermined frequency channel. A signal received by the relay station R1(2) is once demodulated to a base band signal, transmitted to the relay station R2(3) as the base band signal, and then transmitted from the relay station R2(3) to a radio station which is ready for receiving, through an appropriate line connection procedure. The radio station Bn(6), which has recognized that the transmitted signal is data directed to the self-station, acknowledges by using one of the pair frequencies of the channel used by the relay station R2(3). Thereby, the connected radio stations A(1) and Bn(6) can exchange data.

Figure 2:
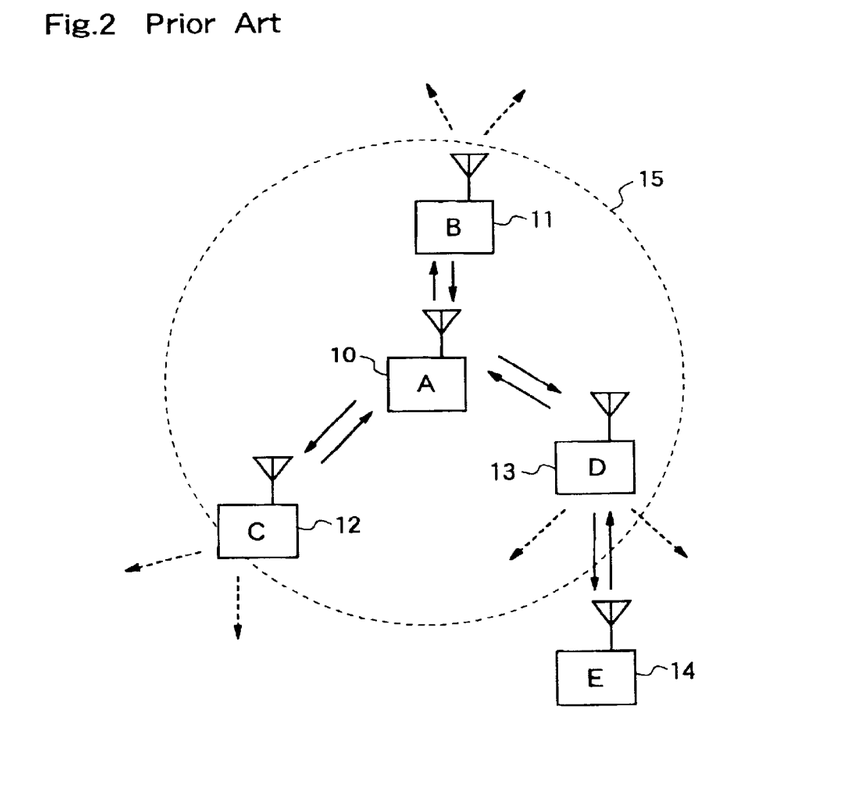
FIG. 2 is a diagram for explaining a relay operation by polling in the conventional radio communication system.

As an alternative, there is a relay system shown in FIG. 2 in which each of plural radio stations is provided with a relay function, and these radio stations are interconnected to relay data in cooperation with each other. In this system, when a radio station A(10) exchanges data with a radio station E(14), initially, the calling radio station A(10) outputs a connection request directly to the radio station E(14). However, since the radio station E(14) is located outside an area 15 within which data from the station A(10) is reachable (hereinafter referred to as "station A area"), the radio station E(14) cannot receive the request and, therefore, it cannot acknowledge the request.

Next, the radio station A(10) outputs relay requests simultaneously to many unspecified radio stations which are located within the station A area 15. Then, radio stations B(11), C(12), and D(13), which have received the relay requests from the radio station A(10), acknowledge that they are ready for relay, while confirming an absence of signals transmitted from other stations in a carrier sense. Since the radio station A(10) can recognize the communicable radio stations by the ID codes of the radio stations which have made the acknowledgments, it inquires to each radio station whether it can be connected to the radio station E(14) or not. On receipt of the inquiry, each radio station outputs a connection request to the radio station E(14). In FIG. 2, the radio stations C(12) and D(13) are connectable to the radio station E(14), and the radio station A(10) which has received this information outputs a relay request to one of the radio stations C(12) and D(13) to perform data exchange with the radio station E(14) through this relay station.

In the conventional relay system shown in FIG. 1, since the relay stations must be arranged in advance as radio equipment, the data transmissible range is decided by the arrangement of the relay stations. Therefore, when the calling station or the called station is outside the communication ranges of the relay stations, these radio stations cannot exchange data.

Further, in the radio communication system shown in FIG. 2 wherein each radio station is provided with a relay function, since each radio station can perform the relay operation independently, the communication range is extended as compared with the relay system where the relay stations are fixed. In this system, however, it is necessary to search all of the radio stations which can communicate with the calling station for an object relay station until the calling radio station is connected to the called station, and this complicates the line connection procedure by relay and increases the time required until the line connection is completed.

SUMMARY OF THE INVENTION

The present invention is made to solve the above-described problems and has for its object to provide a low-power radio communication system for relaying transmitted data to extend the communication area, in which, when a calling station is connected with a called station via a relay station, an optimum communication path can be selected without requiring many complicated procedures.

Other objects and advantages of the invention will become apparent from the detailed description that follows. The detailed description and specific embodiments described are provided only for illustration since various additions and modifications within the scope of the invention will be apparent to those of skill in the art from the detailed description.

According to a first aspect of the present invention, there is provided a radio communication system in which a plurality of radio stations perform data exchange by radio communication. In this system, each of the radio stations has a function of outputting data to another radio station in the radio communication system, a function of receiving data from another radio station, and a function of relaying data in response to a request from another radio station. When the radio station outputs data to a specific target radio station but there is no acknowledgment from the target radio station, the radio station outputs relay requests to many unspecified radio stations, and the radio stations, which have received the relay requests, relay and output the data simultaneously to the target radio station. Therefore, the radio terminal can complete the line connection request to the target radio terminal by the minimum procedure, whereby a number of complicated procedures and time required for line connection can be reduced.

According to a second aspect of the present invention, in the above-described radio communication system, when the target radio station, which has received the data relayed by the many unspecified relay stations, acknowledges the receipt of the data, it selects an optimum radio station for relaying the data from the reception level status of radio packets which have been simultaneously transmitted from the many unspecified radio stations, and outputs acknowledgment data to the selected radio station. Therefore, the target radio station can select an optimum relay station from plural relay stations, whereby a communication path via a relay station can be constructed by the minimum line connection request.

DETAILED DESCRIPTION OF THE PREFERRED EMBODIMENT

Figure 5:
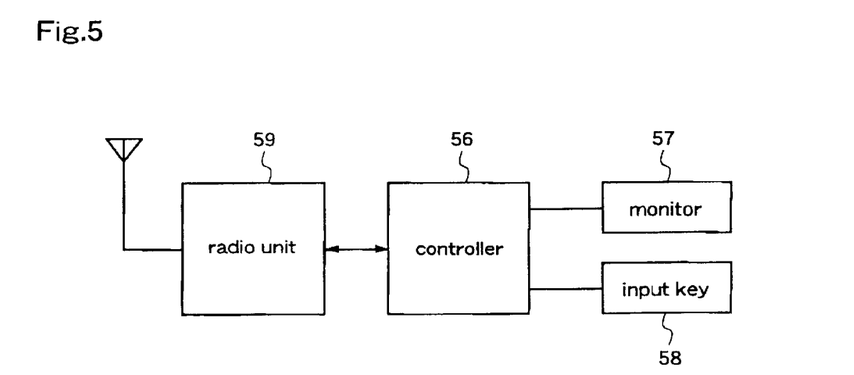
FIG. 5 is a block diagram illustrating a radio station according to the embodiment of the invention.

FIG. 5 is a block diagram illustrating the structure of a radio station employed in a radio communication system according to an embodiment of the present invention.

With reference to FIG. 5, the radio station comprises a radio unit 59, a controller 56, a monitor 57, and an input key 58. The controller 56 controls input/output data of the monitor 57 and the input key 58, the radio unit 59, and the radio communication procedure.

Figure 3:
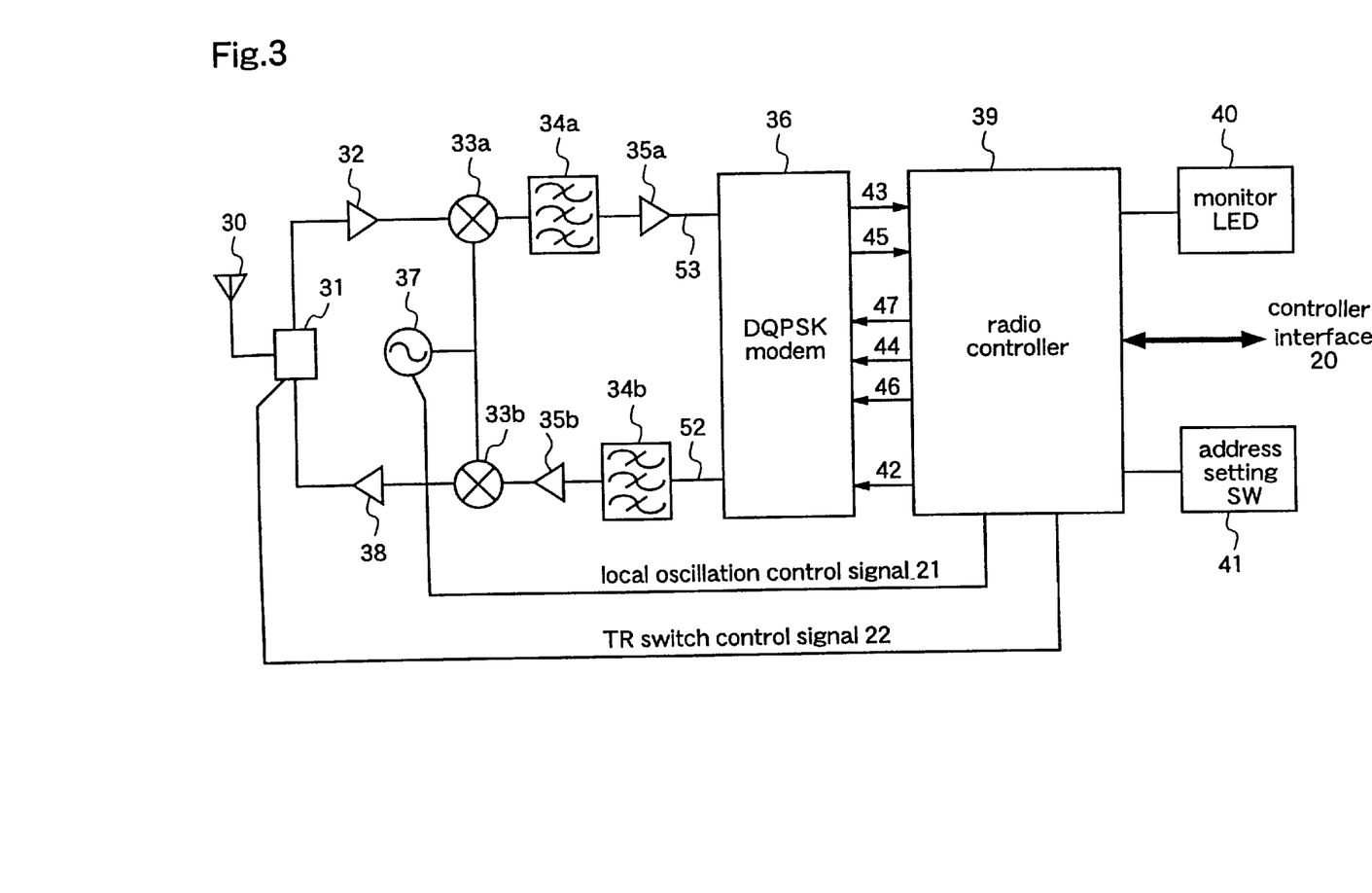
FIG. 3 is a block diagram illustrating a radio unit employed in a radio communication system according to an embodiment of the present invention.

FIG. 3 is a block diagram illustrating the structure of the radio unit 59. With reference to FIG. 3, reference numeral 30 denotes a common antenna for both transmission and reception, and numeral 31 denotes a transmit-receive switch (hereinafter referred to as "TR switch"). In this embodiment, ping-pong transmission is performed.

A reception signal is appropriately amplified by an LNA (Low Noise Amplifier) 32, and converted to an intermediate frequency (hereinafter referred to as "IF") signal by a mixer 33a. Reference numeral 34a denotes an IF-stage BPF (Band Pass Filter). The frequency-converted signal is band-limited to one channel band by the BPF 34a, amplified by an IF amplifier 35a, and input to a DQPSK modem 36.

On the other hand, a transmission signal is modulated by the DQPSK modem 36, band-limited by a BPF 34b, and amplified by an IF amplifier 35b. Thereafter, the amplified signal (transmission signal) is up-converted to an RF signal by a mixer 33b, power-amplified by a power amplifier 38, and input to the TR switch 31.

Reference numeral 37 denotes a local oscillator which is set at a predetermined frequency channel by a local oscillation control signal 21 supplied from a radio unit controller 39. A TR switch control signal 22 controls the TR switch 31 to select one of the transmission signal and the reception signal.

Furthermore, a monitor LED 40 displays the status of the radio unit 59, and an address setting SW 41 sets addresses to be assigned to the respective radio stations.

Figure 4:
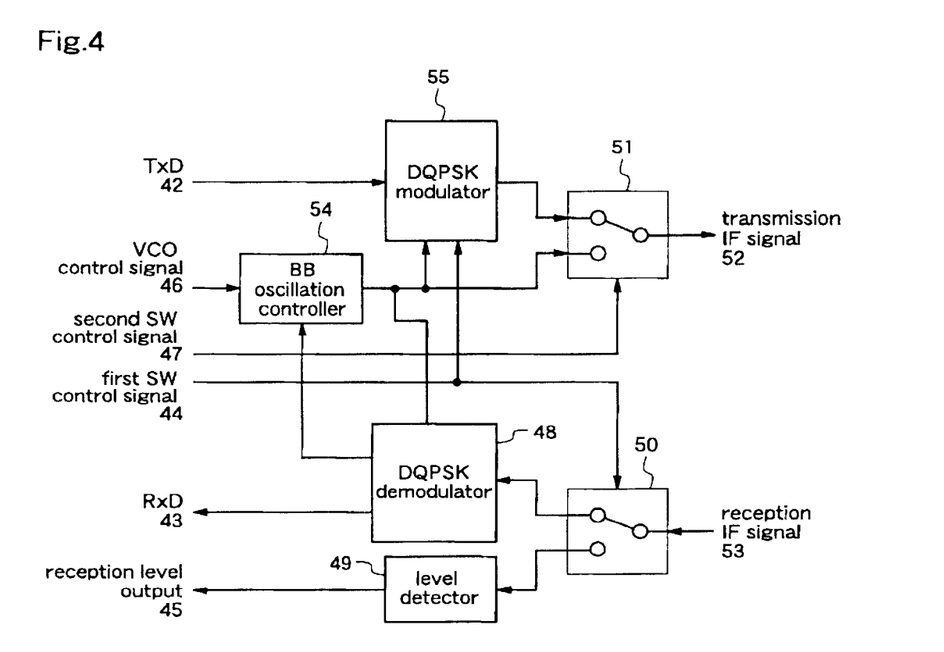
FIG. 4 is a block diagram illustrating a DQPSK modem in the radio unit shown in FIG. 3.

FIG. 4 is a block diagram illustrating the structure of the DQPSK modem 36.

While in this embodiment a differential QPSK (DQPSK) modulation-demodulation method is employed, the modulation-demodulation method is not restricted thereto.

With reference to FIG. 4, in a DQPSK modulator 55, transmission data TxD(42) is serial-to-parallel-converted to 2-bit data, and the 2-bit data is converted to a differential code for quadrature modulation (QM). Then, the QM data is subjected to ON/OFF control according to a first SW control signal 44 and then transmitted to a transmission SW 51. In the transmission SW 51, one of a signal from the DQPSK modulator 55 and a signal from a BB oscillation controller 54 (non-modulated signal) is selected according to a second SW control signal 47, and the selected signal is output as a transmission TF signal 52.

On the other hand, a reception IF signal 53 is input to a reception SW 50, wherein it is decided whether this signal 53 is to be transmitted to a DQPSK demodulator 48 or a level detector 49, according to the first SW control signal 44. In the DQPSK demodulator 48, the reception IF signal is demodulated to reception data RxD(43) and transmitted to the radio controller 39. In the level detector 49, the reception power of the reception IF signal 53 is converted to a voltage to be output as a level signal 45.

Tile BB oscillation controller 54 is an oscillator for DQPSK modulation and demodulation. This oscillator receives a VCO control signal 46 from the radio controller 39 as a frequency setting signal for modulation of the DQPSK modulator 55, and receives a frequency control signal for demodulation from the DQPSK demodulator 48.

The radio communication system according to the embodiment of the invention includes a plurality of radio stations having the same structure as the above-described radio station, and a unique address is set for each radio station by the address setting SW 41.

Hereinafter, the radio communication procedure will be described.

Figure 9:
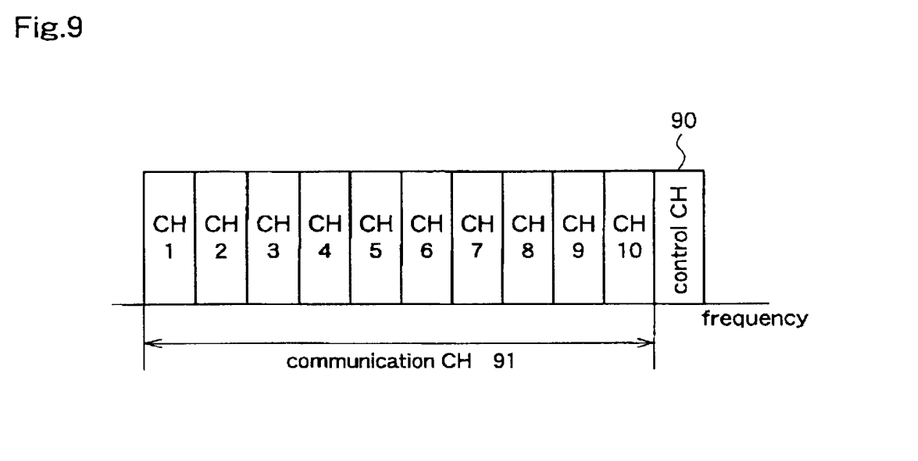
FIG. 9 is a diagram for explaining frequency assignment according to the embodiment of the invention.

FIG. 9 shows assignment of frequencies used for the embodiment of the invention. A control CH 90 is a channel for the procedure until call connection, i.e., for connection request from a calling station and acknowledgment from a called station. When a connection is established, the calling station and the called station perform communication by using a channel which is not used and has the same frequency band, amongst communication channels CH1~CH10 (91).

Figure 6:
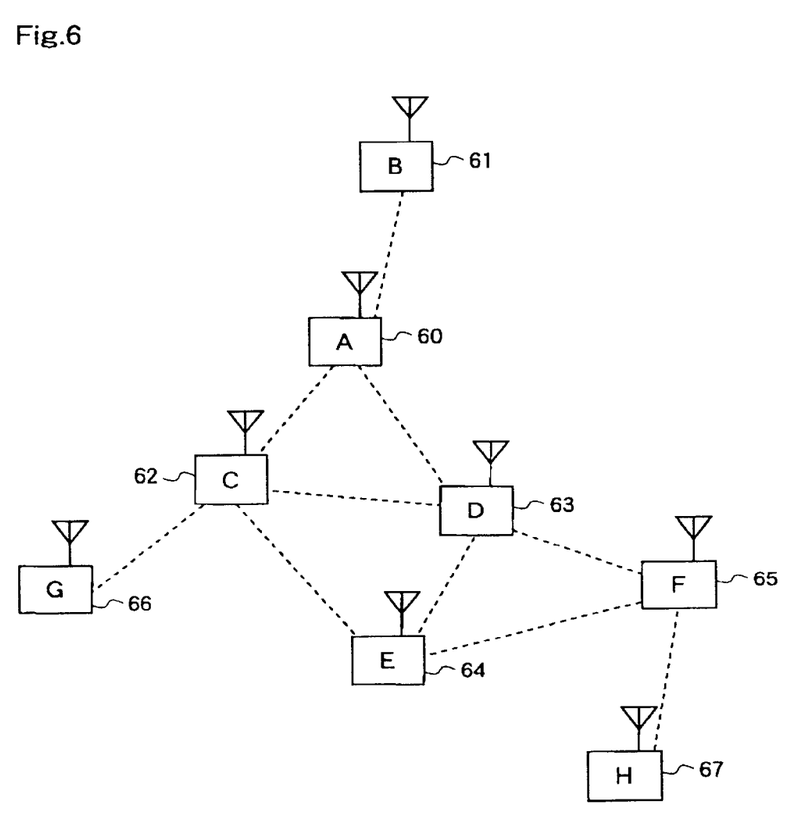
FIG. 6 is a diagram illustrating locations of radio stations for explaining the connection procedure according to the embodiment of the invention.

Assuming that the radio stations are located as shown in FIG. 6, the normal mode (direct) line connection procedure and the relay mode line connection procedure will be described hereinafter. In FIG. 6, radio stations which can directly exchange data are connected by dotted lines. For example, although a station A(60) can be radio-connected to a station B(61), a station C(62), and a station D(63), it cannot be directly connected to a station E(64), a station F(65), a station H(67), and a station G(66). When the station A(60) should exchange data with the station E(64), the station A(60) requests the other stations to relay data, and a radio station which can be connected to the station E(64) serves as a relay station, whereby the station A(60) and the station E(64) can exchange data.

Initially, the normal mode line connection procedure will be described.

Figure 7:
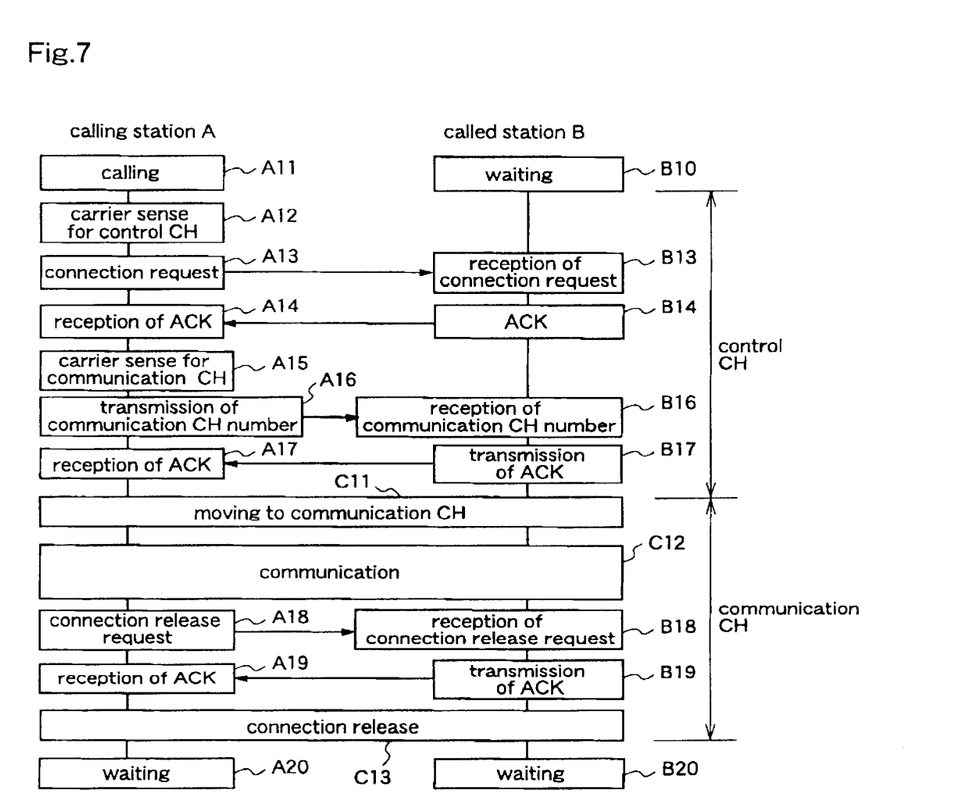
FIG. 7 is a diagram illustrating the normal mode connection procedure according to the embodiment of the invention.

In FIG. 6, the station A(60) and the station B(61) are located such that they can be directly connected. In this case, communication between these stations is made according to generally-known line connection procedure which is shown in FIG. 7.

First of all, a calling station (station A(60)) makes a call (A11). Thereafter, just before transmitting data, the station A performs carrier sense (A12) for the control CH 90 to confirm that other radio stations do not perform communication. If some carrier is detected, the station A(60) generates a delay time by using a random number and retries carrier sense after the delay time.

After confirming that the control CH 90 is available, the station A(60) sends a connection request (A13) directly to a called station (station B(61)). The station B(61) detects the connection request directed to the self-station (B13). When the station B(61) is connectable to the station A, it outputs an ACK (acknowledgement) (B14). On receipt of the ACK (A14), the station A(60) selects an unused channel from the communication channels CH1~CH10 by carrier sense (A15) and sends the selected communication CH number (A16). The station B outputs an ACK (B17) when the data is correctly received (B16). Thereafter, both the calling station A(60) and the called station B(61) move into the communication channel (C11) to perform data exchange (C12). When data exchange is completed, the calling station A(60) sends a connection release request to the called station B(61) (A18). The called station B(61) outputs an ACK when it can release the connection (B19), whereby the connection is released (C13) and the stations A(60) and B(61) enter the wait states (A20,B20).

Next, the relay mode line connection procedure will be described with reference to FIG. 8.

When the station A(60) communicates with the station E(64) in FIG. 6, the station C(62) or the station D(63) is required as a relay station.

Figure 8:
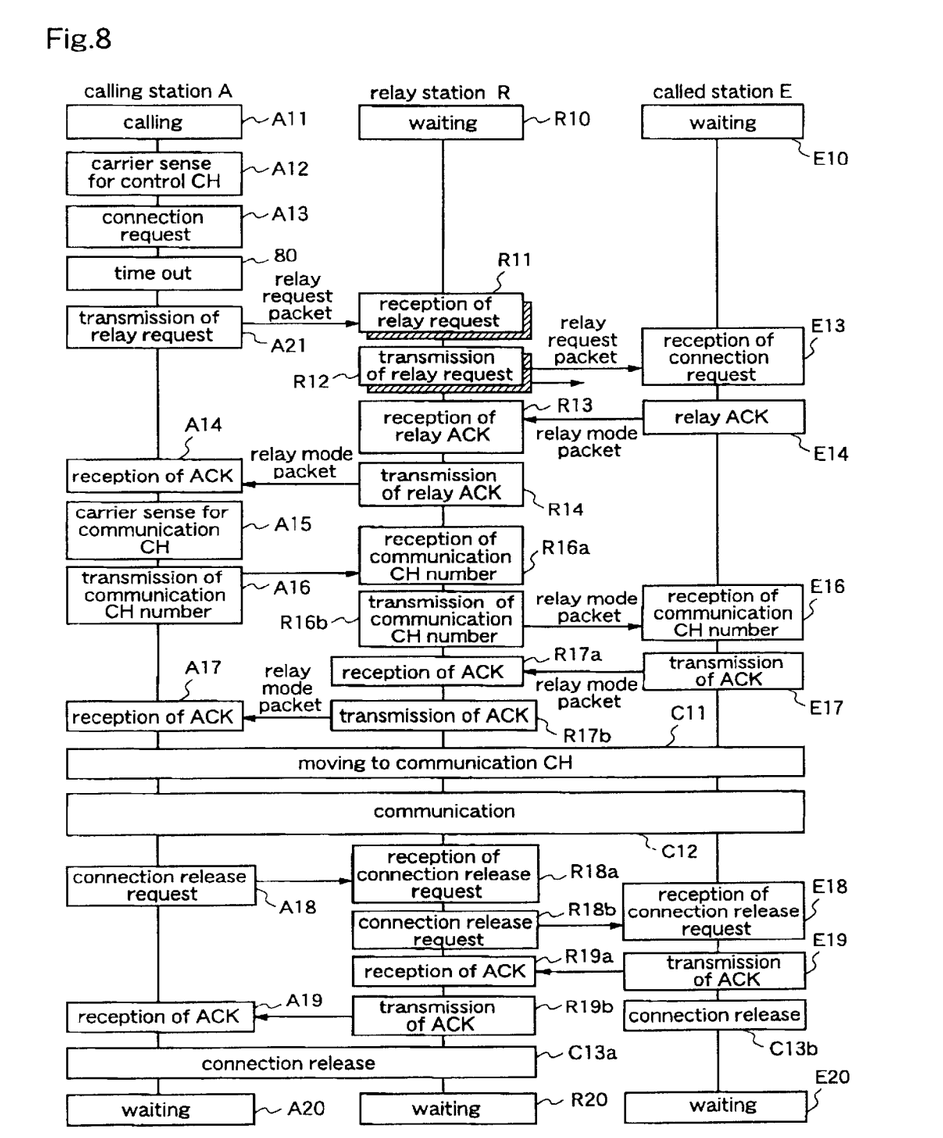
FIG. 8 is a diagram illustrating the relay mode connection procedure according to the embodiment of the invention.

Turning to FIG. 8, the calling station A(60) performs in the same way as described above until the connection request (A13). However, when the called station E(64) is not located within the radio communication area of the station A, the station A(60) receives no ACK from the station E(64). Therefore, after the connection request (A13), time-out occurs (80).

Then, the calling station A(60) sends relay requests toward many unspecified radio stations (A21). Each relay request is transmitted as a relay request packet 113 shown in FIG. 10. A radio station (relay station R) which has received the relay request from the calling station A (R11) and can acknowledge, relays the relay request packet 113 and outputs it (R12). Assuming that the stations B(61), C(62), and D(63) shown in FIG. 6 can acknowledge, each of these stations outputs the relay request packet. However, in the conventional method of outputting the relay request packet while confirming the channel state by carrier sense, packet transmission between the relay stations takes time, and recognition of a radio station with which the self-station can communicate takes much time. Therefore, in the embodiment of the present invention, after a predetermined period of carrier sense (A12), when the idle states of the respective stations are confirmed, the relay request packets 113 are output from the respective stations B(61), C(62), and D(63) at the same output timing (R12).

Figure 10:
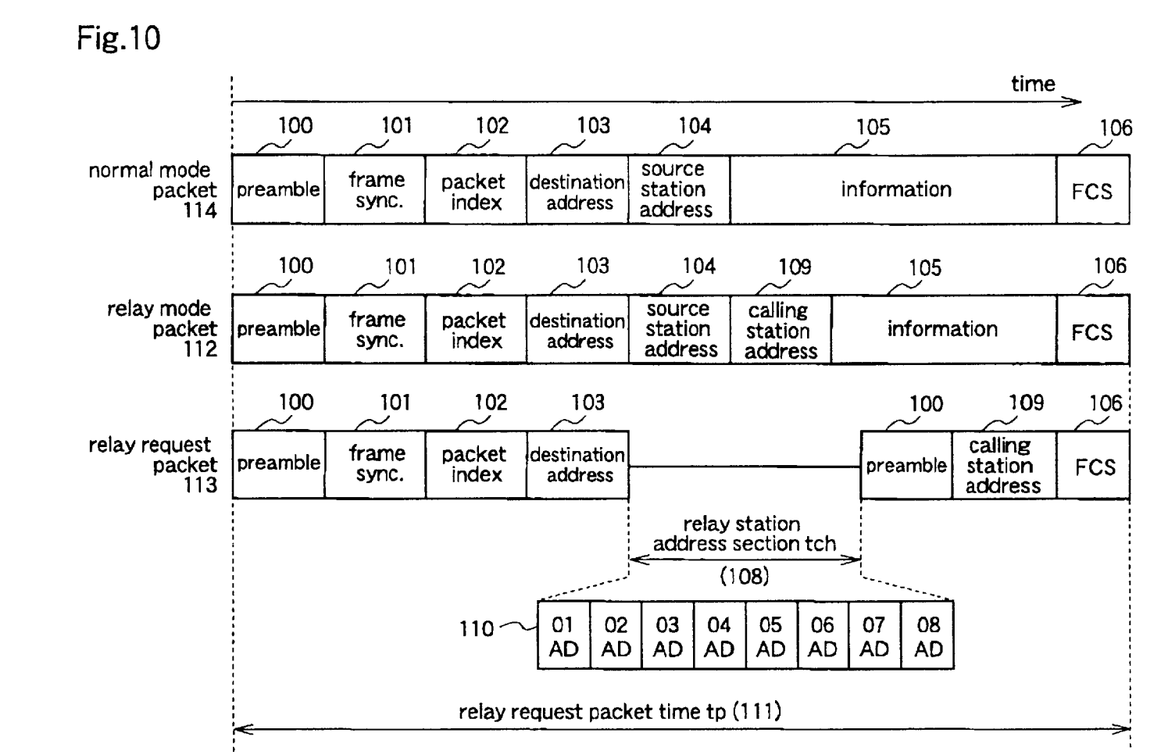
FIG. 10 is a diagram illustrating the structures of radio packets according to the embodiment of the invention.

FIG. 10 shows the structure of a normal mode packet 114, the structure of a relay mode packet 112, and the structure of a relay request packet 113 used for transmitting a relay request. The normal mode packet 114 is similar to the packet structure used for the conventional radio communication. Preamble 100 is a 24-bit signal in which "1" and "0" alternately continue on a base band signal. Frame synchronization (frame sync) 101 is a 31-bit pseudo random code which is predetermined, and this becomes a basis of frame synchronization. Packet index 102 is 4-bit status data indicating the current status of the packet. Destination station address 103 indicates an address to which the packet is to be transmitted, and source station address 104 contains the address of the self-station. Each address is a 16-bit code which is set by the address setting SW 41. Information 105 is an area where a datagram to be transmitted is stored. In the normal mode packet, the length of this datagram is variable according to the data length. FCS 106 is an error check code for the data from the packet index 102 to the information 105.

In the relay mode, two different packets are appropriately used according to two different statuses.

The relay request packet 113 is used for data transmission via a relay station when a calling station calls a station. In the relay request packet 113, preamble 100, frame sync 101, packet index 107, and destination station address 103 are identical to those of the normal mode packet 114. However, the relay request packet 113 includes a relay station address section 108 which is not possessed by the normal mode packet 114. The relay station address section tch (108) does not have a code such as in the normal mode packet, but a non-modulated signal is intermittently input from the address of each relay station at a predetermined period of time. For example, when a radio station of address 01 outputs the relay request packet 113, it outputs a non-modulated signal only in a period 110 shown in FIG. 10. The relay station address is followed by preamble 100 of 24 bits, and calling station address 109. In the calling station address 109, the address of the station A is entered because the station A has made the call. Since the relay mode packet 112 is a fixed-time packet which is fixed to the relay packet time tp (111), the data area has a fixed length. The data area is followed by FSC, which is an error check code for the packet index 102, the destination address 103, the calling station address 109, and the information 105.

Turning to FIG. 8, the radio station R recognizes that the relay request packet transmitted from the calling station A is a packet to be relayed, from the packet index 102. Then, the radio station R inputs a non-modulated signal into the relay station address 108 in the relay request packet 113 at the time position corresponding to the address of the self-station, and outputs the relay request packet 113. The timing of outputting the relay request packet 113 depends on the time from the frame sync 101 of the calling station A.

Figure 11:
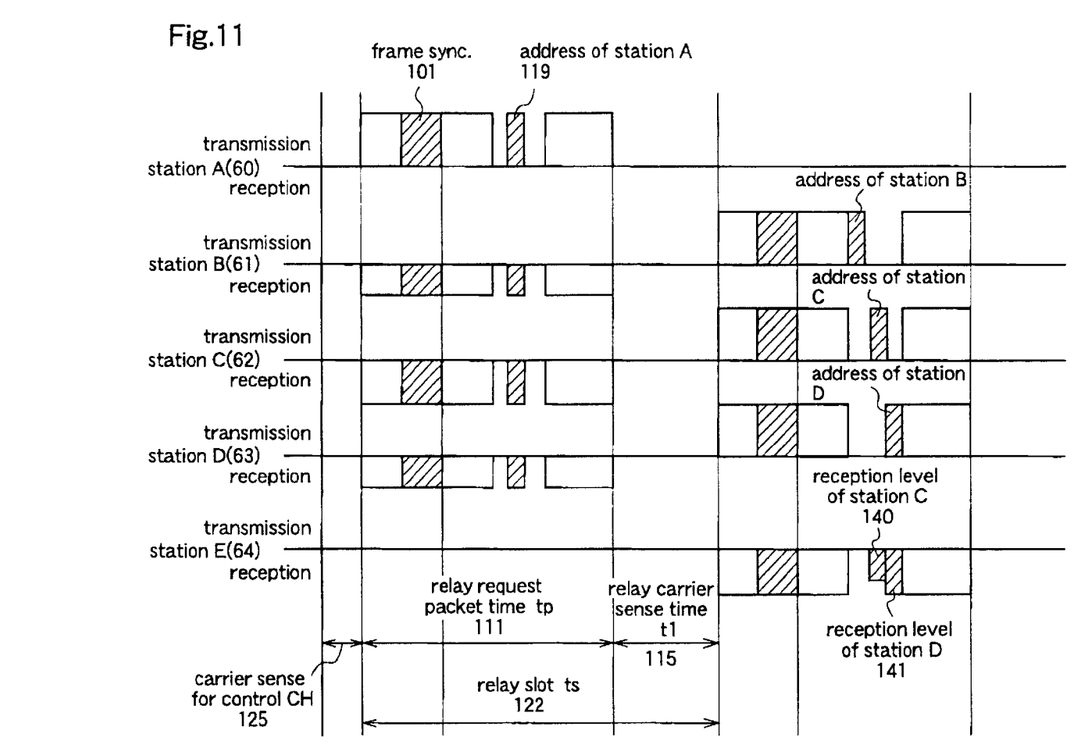
FIG. 11 is d time chart for explaining the relay operation according to the embodiment of the invention.

The process of outputting the relay request packet 113 will be described in more detail with reference to FIG. 11. In FIG. 11, according to the arrangement of the radio stations shown in FIG. 6, the station A(60) is a calling station, the station E(64) is a called station, and the stations B(61), C(62), and D(63) are relay stations.

When the calling station A(60) outputs the relay request packets 113, since the stations B(61), C(62), and D(63) are ready for relay, the elapsed time from detecting the frame sync 101 is measured. After receiving the relay request packet (relay request packet time tp (111)) from the station A(60), the relay stations perform carrier sense by the relay carrier sense time t1 (115), and output the relay request packets 113 at the same time. The relay request packet time tp (111) and the relay carrier sense time t1 (115) are fixed time lengths, and the total of these times is regarded as relay slot ts (122). The relay request packets 113 simultaneously output from the stations B(61), C(62), and D(63) are received by the called station E(64). Since the data stored in the relay request packets 113 are identical except the relay station addresses, even if some data delay occurs, this delay can be demodulated. In each of the relay request packets 113, since a non-modulated signal is transmitted to the relay station address at a time which has been decided according to the time table of each relay station, the reception level varies according to the distances between the station E(64) and the respective relay stations, whereby the station E(64) can detect the non-modulated signal which has been transmitted from the radio station with which the station E(64) can communicate. Accordingly, the called station E(64) can determine the address of each relay station by measuring the time on the basis of the frame sync 101 and, further, it can determine the distance between the relay station and the self-station by measuring the reception level at that time. FIG. 11 shows the reception level 140 of the station C(62) and the reception level 141 of the station D(63). In this way, by connecting the calling station with the called station via a relay station having the highest reception level, an optimum communication path can be constructed.

When the station E(64) outputs an ACK to the relay station, as the destination address of the relay mode packet 112, a specific relay station is specified (for example, station D(63) when the reception level of the relay station address of the station D(63) is the highest), while the other relay stations are released from this relay operation and enter the wait state (R10) when any of the following conditions (1)–(4) are satisfied:

(1) When there exists no station which performs relay in the relay slot next to the relay operation of the self-station, i.e., those stations positioned at the end of the communication area (in this embodiment, stations B, G, H), end the relay operation and enter the wait state when the time of two relay slots has passed;

(2) When a station other than the self-station is selected as a relay station (station D), the non-selected station immediately ends the relay operation and enters the wait state;

(3) When a bit error is detected during the relay operation (station F), the station ends the relay operation and enters the wait state; and (4) When time-out occurs, the relay station ends the relay operation and enters the wait state.

After selecting the relay station R in this way, the called station E receives the connection request (A13) from the calling station A as shown in FIG. 8 (E13), and outputs an ACK to the calling station A via the relay station R (E14).

At this time, since the destination station is defined, the ACK is transmitted in the form of the relay mode packet 112 shown in FIG. 10. When the called station E transmits the packet to the relay station D, the address of the station D is entered as the destination address 103, the address of the station E is entered in the source station address 104, and the address of the station A is entered in the calling station address. Further, the relay mode packet 112 has a packet length equivalent to a time decided by the relay request packet time tp (111), like the relay request packet 113.

On receipt of the ACK (A14), the calling station A selects a communication CH 91 by carrier sense (A15), and sends the communication CH number to the called station E via the relay station D (A16, R16a, R16b, E16). With an ACK from the called station E to the calling station A (E17, R17a, R17b, A17), the line connection procedure is completed. Then, the calling station A, the relay station D, and the called station E move to the communication channel indicated by the communication CH number (C11) and, thereafter, communication is carried out via the relay station like in the normal mode (C12).

Figure 12:
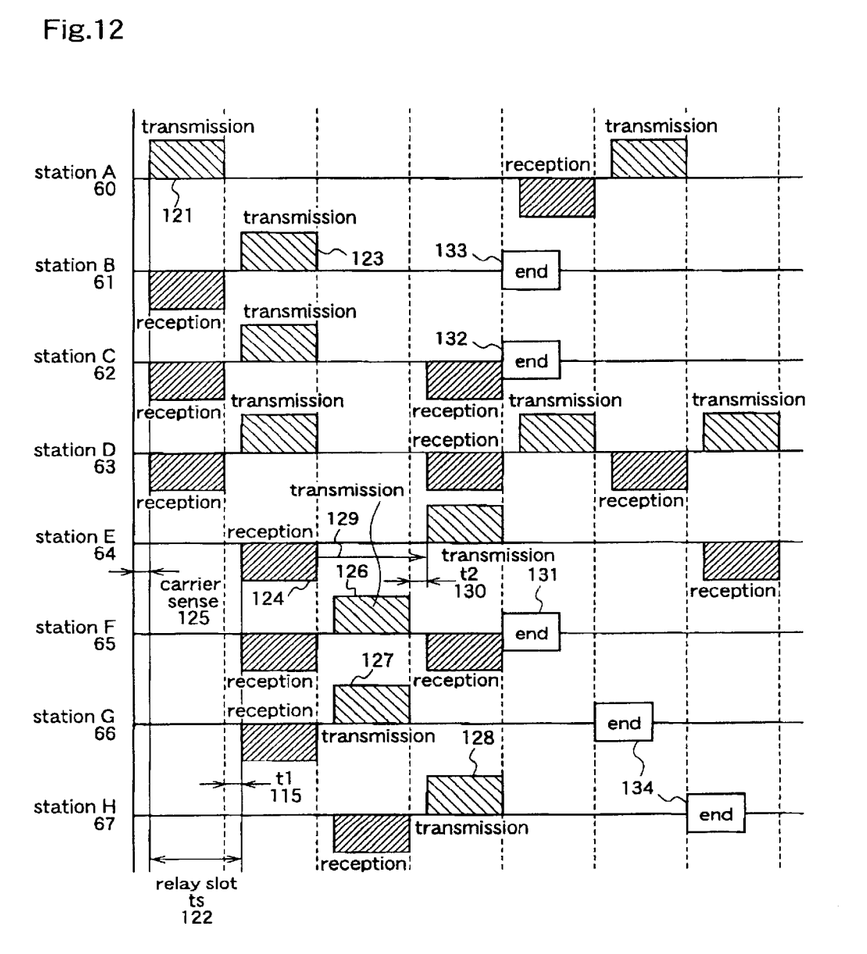
FIG. 12 is a time chart for explaining the radio station connecting procedure and the connection release procedure according to the embodiment of the invention.

FIG. 12 shows the manner of connecting the station A(60) to the station E(64) in the relay mode, and the operations of the respective stations.

Initially, the station A(60) outputs a connection request (A13 in FIG. 8) in the normal mode. When time-out occurs (80 in FIG. 8), the normal mode is switched to the relay mode. In the relay mode, the station A(60) performs carrier sense for a control channel (125) and, thereafter, outputs a relay request (121) ((A21) in FIG. 8). Since the stations B(61), C(62), and D(63) which have received the relay request ((R11) in FIG. 8), are ready for a relay operation, these stations perform carrier sense for the relay carrier sense time t1 (115). When no carrier is detected, these stations output the relay request packets 113 at the same time (123) ((R12) in FIG. 8). The station E(64) receives the relay request packets 113 from the stations C and D (124) ((E13) in FIG. 8), and recognizes, from the destination address, that the connection request is relayed to the self-station. The station F(65) receives the relay request packet 113 from the station D and performs relay according to the relay request (126). The station G(66) receives the relay request packet 113 from the station C(62) and performs relay like the station F(65) (127). The station H(67) receives the relay request packet 113 from the station F(65) and performs relay in like manner (128).

After the station E(64) recognizes the connection request directed to the self-station ((E13) in FIG. 8), it outputs the relay mode packet at a time delayed by the time 129 shown in FIG. 12 ((E14) in FIG. 8). The reason why this ACK packet is delayed by one relay slot 122 is as follows. Assuming that the station E(64) acknowledges immediately after detecting the packet directed to the self-station, when a station like the station F(65) shown in FIG. 12 exists, the relay request packet 113 from the station F(65) to the station D(63) may interfere with the ACK packet from the station E(64) to the station D(63). By the way, the carrier sense time t2 (130) when the called station acknowledges should be set shorter than the relay carrier sense time t1 (115). The reason is as follows. Since the acknowledgement of the called station has priority to the relay operation, when the acknowledgement of the called station is performed, the relay station should not output the relay request packet. In FIG. 12, since the station H(67) and the station E(64) are too distant from each other to detect the transmission signals with each other, the station H(67) outputs the relay request packet 113 (128). However, since the station H(67) is located in a position where two times of relays are required from the station D(63), it can be supposed that the station H(67) is, by at least one radio communication area, farther from the station D(63) than the station E(64). Therefore, the reception level of the station H(67) is small on the station D(63), so that it does not interfere with the relay mode packet 112 from the station E(64).

The relay mode packet 112, which is the ACK of the station E(64), is received by the station C(62) and the station D(63). When the station C(62) detects that the destination of the relay mode packet is not the self-station, it stops the relay operation and enters the wait state (132) ((R10) in FIG. 8). On the other hand, the station B(61) does not have the next relay operation after outputting the relay request packet 113 and also there is no ACK from the called station E(64). So, the station B(61) stops the relay operation and enters the wait state after two relay slots ts (122) have passed (133) ((R10) in FIG. 8). Likewise, the stations G(66) and H(67) stop the relay operation and enter the wait state (134) after two relay slots ts (122) have passed (134) ((R10) in FIG. 8).

The station E(65) receives the relay mode packet 112 which is the ACK of the station E(64). At this time, if the relay request packet 113 from the station H(67) interferes with the relay mode packet 112 and thereby data error occurs, it stops the relay operation and enters the wait state (131).

In the radio communication system of the present invention, according to the above-described connection procedures, an optimum relay station is selected from many unspecified radio stations to construct an optimum communication path.

What is claimed is:

1. A radio communication system in which a plurality of radio stations perform data exchange by radio communication, wherein:
    each of said plurality of radio stations has a function of outputting data to another radio station in said radio communication system, a function of receiving data from another radio station, and a function of relaying data in response to a request from another radio station;
    the function of relaying data in response to a request from another radio station has a normal mode which is utilized in a state where a line connection can be directly made, and a relay mode in which at least one relay station intervenes between the radio stations;
    when the radio station outputs data to a specific target radio station but there is no acknowledgment from the target radio station, the radio station outputs relay request packets by inputting a non-modulation signal at a time position corresponding to addresses which are assigned to the radio station performing transmission so that the relay of the data is requested to many unspecified radio stations, and the other radio stations, which have received the relay request packets in a radio communication area of the radio station, output the relay request packets by inputting a non-modulation signal at a time position corresponding to addresses which are respectively assigned for each of the other radio stations at the same output timing simultaneously to the target radio station; and
    when the target radio station, which has received the data relay request packets relayed by the many unspecified relay stations, acknowledges the receipt of the data to the relay request packets, it selects an optimum radio station for relaying the data from a reception level status of a signal indicating the address which is assigned to the radio station, the address being inputted into the relay request packets which have been simultaneously transmitted from the many unspecified radio stations, and outputs relay mode packets including the address which is assigned to the radio station, the address being firstly outputted as a target of acknowledging the receipt of the data to the selected optimum radio station.

2. The radio communication system as claimed in claim 1, wherein each of said plurality of radio stations comprises a DQPSK modem.

3. A radio communication system for performing data exchange by radio communication, said radio communication system comprising:
    a plurality of radio stations, wherein each of said plurality of radio stations is operable to output data to at least one of said plurality of radio stations, receive data from at least one of said plurality of radio stations, and relay data to at least one of said plurality of radio stations;
    wherein said radio communication system is operable to exchange data between a first one of said plurality of radio stations, operating as a calling station, and a second one of said plurality of radio stations, operating as a target station, in a normal mode and a relay mode as follows:
        in the normal mode, data can be exchanged directly between the calling station and the target station; and
        in the relay mode, data can be exchanged between the calling station and the target station through at least one relay station;
    wherein, when the calling station outputs data to a target station and the calling station fails to receive a receipt acknowledgment from the target station, the calling station outputs relay request packets by inputting a non-modulation signal at a time position corresponding to addresses which are requested to many unspecified radio stations, and the other radio stations, which have received the relay request packets in a radio communication area of the radio stations, output the relay request packets by inputting a non-modulation signal at a time position corresponding to addresses which are respectively assigned for each of the other radio stations at the same output timing simultaneously to the target radio station; and
    wherein, when the target radio station, which has received the relay request packets relayed by the many unspecified relay stations, acknowledges the receipt of the data to the relay request packets, it selects an optimum radio station for relaying the data from a reception level status of a signal indicating the addresses which are assigned to the radio stations, the addresses being inputted into the relay request packets which have been simultaneously transmitted from the many unspecified radio stations, and outputs relay mode packets including the address which is assigned to the radio station, the address being firstly outputted as a target of acknowledging the receipt of the data to the selected optimum station.

4. The radio communication system as claimed in claim 3, wherein each of said plurality of radio stations comprises a DQPSK modem.

5. A radio communication method for performing data exchange by radio communication using a plurality of radio stations, wherein each of the plurality of radio stations is operable to output data to at least one of the plurality of radio stations, receive data from at least one of the plurality of radio stations, and relay data to at least one of the plurality of radio stations, said radio communication method comprising:

exchanging data between a first one of the plurality of radio stations, operating as a calling station, and a second one of the plurality of radio stations, operating as a target station, in a normal mode and a relay mode as follows:

in the normal mode, data is exchanged directly between the calling station and the target station; and     in the relay mode, data is exchanged between the calling station and the target station through at least one relay station;

wherein, when the calling station outputs data to a target station and the calling station fails to receive a receipt acknowledgment from the target station, the calling station outputs a relay request packets by inputting a non-modulation signal at a time position corresponding to addresses which are assigned to the radio station performing transmission so that the relay of the data is requested to many unspecified radio stations, and the other radio stations, which have received the relay request packets in a radio communication area of the radio station, output the relay request packets by inputting a non-modulation signal at a time position corresponding to addresses which are respectively assigned for each of the other radio stations at the same outputting timing simultaneously to the target radio station; and wherein, when the target radio station, which has received the relay request packets relayed by the many unspecified relay stations, acknowledges the receipt of the data to the relay request packets, it selects an optimum radio station for relaying the data from a reception level status of a signal indicating the address which is assigned to the radio station, the address being inputted into the relay request packets which have been simultaneously transmitted from the many unspecified radio stations, and outputs relay mode packets including the addresses which are assigned to the radio stations, the addresses being firstly outputted as a target of acknowledging the receipt of the data to the selected optimum station.

* * * * *